United States Patent [19]

Imamura

[11] Patent Number: 4,781,664

[45] Date of Patent: Nov. 1, 1988

[54] DRIVE POWER TRANSMISSION SYSTEM

[75] Inventor: Junji Imamura, Hyogo, Japan

[73] Assignee: Mitsuboshi Belting Ltd., Kobe, Japan

[21] Appl. No.: 499,673

[22] Filed: Jun. 2, 1983

Related U.S. Application Data

[63] Continuation of Ser. No. 215,585, Dec. 11, 1980, abandoned, which is a continuation of Ser. No. 35,661, May 3, 1979, abandoned.

[30] Foreign Application Priority Data

Nov. 27, 1978 [JP] Japan ............................. 53-163633

[51] Int. Cl.⁴ .......................... F16H 7/00; F16G 1/28
[52] U.S. Cl. ...................... 474/87; 474/252; 474/139
[58] Field of Search .............. 474/86, 87, 139, 170, 474/188, 189, 238, 252

[56] References Cited

U.S. PATENT DOCUMENTS

| | | | |
|---|---|---|---|
| 1,324,804 | 12/1919 | Donason | 474/189 |
| 2,471,969 | 5/1949 | Meyer . | |
| 2,592,581 | 4/1952 | Lorig | 474/187 |
| 2,728,239 | 12/1955 | Adams . | |
| 2,894,405 | 7/1959 | Carle | 474/149 |
| 3,140,620 | 7/1964 | Ferara | 474/149 |
| 3,151,491 | 10/1964 | Case | 474/149 |
| 3,404,577 | 10/1968 | Zahn . | |
| 3,603,296 | 9/1971 | Mitchell | 474/205 |
| 3,643,518 | 2/1972 | Semin . | |
| 3,951,006 | 4/1976 | Fisher et al. | 474/87 |
| 4,004,466 | 1/1977 | Alba . | |
| 4,015,484 | 4/1977 | Taylor . | |
| 4,028,955 | 6/1977 | Fisher et al. | 474/87 |
| 4,031,761 | 6/1977 | Fisher . | |
| 4,047,445 | 9/1977 | Anderson | 474/94 |

FOREIGN PATENT DOCUMENTS

| | | |
|---|---|---|
| 1189350 | 3/1965 | Fed. Rep. of Germany . |
| 2438815 | 3/1975 | Fed. Rep. of Germany . |
| 580601 | 9/1924 | France .................... 474/189 |
| 52-53175 | 4/1977 | Japan ...................... 474/251 |
| 946786 | 1/1964 | United Kingdom . |

OTHER PUBLICATIONS

European Patent Application No. 0,011,986, published Jun. 11, 1980 (pp. 16 and 17).
Japanese Patent Abstract, vol. 1, #115, Sep. 30, 1977, p. 3688M77 (Kokai No. 52-53175).
"Engineering Standard Specifications for Drives Using V-Ribbed Belts", (Rubber Manufacturers Association, Mechanical Power Transmission Assoc. and the Rubber Assoc. of Canada, 1977).

Primary Examiner—Lawrence J. Staab
Attorney, Agent, or Firm—Sughrue, Mion, Zinn, Macpeak, and Seas

[57] ABSTRACT

A drive power mission system having a driving pulley, a plurality of driven pulleys, and the power transmission belt laid in a serpentine manner over the pulleys. The driving pulley and at least one driven pulley, which are in contact with the inner surface of the power transmission belt, have a plurality of V-grooves arranged circumferentially. The V-groove fits to ribs formed on the inner surface of the belt, and the remaining pulley or pulleys, which are engaged with the outer surface of the power transmission belt have a plurality of protrusions arranged in parallel and circumferentially. The protrusions engage the outer surface of the belt, which is flat, and the power transmission belt is an endless belt having a plurality of ribs arranged longitudinally thereof. The ribs are substantially equal in section along the widthwise direction of the belt and the outer surface of the belt is flat. The driven pulley or pulleys engaged with the outer surfaces of the belt prevents the belt from transverse shifting.

9 Claims, 2 Drawing Sheets

DRIVE POWER TRANSMISSION SYSTEM

This application is a continuation of application Ser. No. 215,585, filed Dec. 11, 1980, now abandoned, which is a continuation of application Ser. No. 035,661, filed May 3, 1979, now abandoned.

BACKGROUND OF THE INVENTION

This invention relates to drive devices such as power transmission belts, and more particularly to a drive device in which a ribbed belt has a tension section, a neutral axis section and a compression section. The outer surface of the belt, i.e., the upper surface of the tension section is flat. The compression section, i.e., the inner surface of the belt, has a plurality of ribs arranged longitudinally thereof. Alternatively a banded belt having a plurality of V-belt bodies having a trapezoidal section is arranged in parallel and separately from one another and a tie band of rubberized fabric or rubberized code fabric is laid over the upper surfaces of the V-belt bodies to connect them. The fabric is laid in a serpentine manner over a driving pulley and a plurality of driven pulleys.

Heretofore, in V-belt drive devices for an automobile, V-belts are, in general, laid over a crank pulley, a alternator pulley and a fan pulley, over a crank pulley and a power steering pulley, and over a crank pulley and a cooler pulley, respectively. That is, several belts are used in one automobile.

However, a device in which only one ribbed belt is laid in a serpentine manner over such pulleys to drive the latter has been proposed and is being put into actual use (See: U.S. Pat. Nos. 3,951,006, 4,031,761 and 4,028,955).

This conventional drive device utilizes the technological merits of a ribbed belt which is thin and flexible. In the drive device, the outer surface or the inner surface of one ribbed belt are selectively brought into contact with a crank pulley, a fan pulley, a power steering pulley, an alternator pulley, a cooler pulley, etc., and an idler pulley is provided to give a predetermined tension to the belt. That is, the ribbed belt is laid in a serpentine manner over these pulleys. Among these pulleys, at least one pulley, for instance the fan pulley, is a flat pulley which is driven by the outer surface of the belt.

The drive device of this type is advantageous over the drive device in which several belts are laid over pulleys in the following respects:

(1) Since the width of the pulleys can be reduced, the space in the automobile can be effectively utilized, and the weight of the automobile can be reduced.

(2) Since the ribbed belt is more flexible than a V-belt, the amount of energy consumed for driving the belt can be reduced, and accordingly, fuel consumption is reduced.

(3) Since the tension of the belt is adjusted by the idler pulley, fluctuation of the belt tension is less, and therefore the belt is not susceptible to breakage.

(4) Since only one belt is laid over the pulleys, if the belt is broken, it can be readily replaced with a new one.

However, the disadvantage of this conventional drive device resides in the use of the flat pulley. Since the flat pulley has no pulley groove, the belt is liable to transversely shift on the pulley, which may non-uniformly wear the belt and cause abnormal sounds.

The rib thickness of the ribbed belt is about or less than half of the thickness of the V-belt. Therefore, if the belt is vibrated, then the ribs of the belt are disengaged from the grooves of the pulley. Therefore the belt is transversely shifted on the pulley and in a worst case, it may come off the pulley.

SUMMARY OF THE INVENTION

Accordingly, an object of this invention is to eliminate all of the drawbacks accompanying a conventional drive device.

Another object of the invention is to provide a drive device in which during the run of the belt, transverse shifting of the ribbed belt or the banded belt is prevented.

Still another object of this invention is to prevent the non-uniform wear of the belt and the generation of abnormal sound and to prevent the belt from coming off the pulley.

According to the invention, a drive system is provided with a power transmission belt. The overall system has a driving pulley, a plurality of driven pulleys, and a power transmission belt laid in a serpentine manner over the pulleys. According to the invention, the driving pulley and at least one driven pulley are in contact with the inner surface of the power transmission belt and have a plurality of V-grooves arranged circumferentially. The V-grooves are fitted to ribs formed on the inner surface of the belt and the remaining pulley or pulleys which are engaged with the outer surface of the power transmission belt have a plurality of protrusions arranged in parallel and circumferentially. These protrusions engage the outer surface of the belt, which is flat. The power transmission belt is an endless belt having a plurality of ribs arranged longitudinally; the ribs being substantially equal in section along the widthwise direction of the belt and the outer surface of the belt being flat. The driven pulley or pulleys, engaged with the outer surface of the belt, prevent the belt from transversely shifting.

This invention will be described with reference to the accompanying drawings in detail.

DESCRIPTION OF THE PREFERRED EMBODIMENTS

Figure 1:
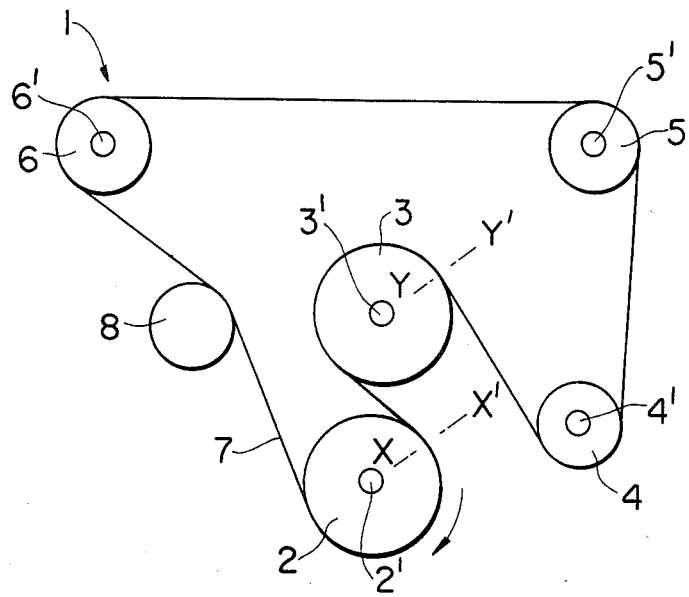
FIG. 1 is an explanatory diagram showing a preferred embodiment of a drive device concerning a power transmission belt according to this invention.

FIG. 1 shows a drive system in the context of a power transmission belt in an automobile engine. Driven pulleys, i.e., a fan pulley 3, a power steering pulley 4, an alternator pulley 5 and a cooler pulley 6 are arranged around a driving pulley, i.e., a crank pulley 2 according to the placement of equipment of the engine.

The power transmission belt 7 is laid operatively over these pulleys. A predetermined tension is applied to the power transmission belt 7 by a tension pulley 8 coupled to a tension device.

The shafts 2', 3', 4', 5' and 6' of pulleys 2, 3, 4, 5 and 6 are arranged in parallel with one another, and the V-grooves of the pulleys 2, 4, 5 and 6 in contact with the inner surface of the power transmission belt 7 are in the same plane. If the shafts are not in parallel or, slightly displaced relative to each other, then the power transmission belt 7 will be non-uniformly worn or will come off the pulleys.

The fan pulley 3 is driven by the outer surface of the power transmission belt 7. If the fan pulley 3 is a flat pulley, then the belt is liable to transversely shift. More specifically, when the crank pulley 2 is rotated in the direction of the arrow, the power steering pulley 4 and the crank pulley 2, located respectively upstream of and downstream of the fan pulley 3 which is driven by the outer surface of the belt 7, do not cause the belt 7 to transversely shift because the pulleys 2 and 4 are driven by the inner surface of the belt 7. However, if the fan belt 3 driven by the outer surface of the belt 7 is a flat pulley, then the belt 7 is transversely shifted at the fan pulley 3, and the belt 7 thus shifted is moved to the crank pulley 2. As a result, the belt 7 is non-uniformly worn or causes abnormal sounds, and in an extreme condition comes off the pulley.

Figure 2:
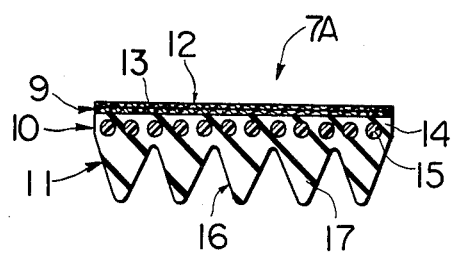
FIGS. 2 and 3 are sectional views showing ribbed belts employed for the drive device according to the invention.
Figure 3:
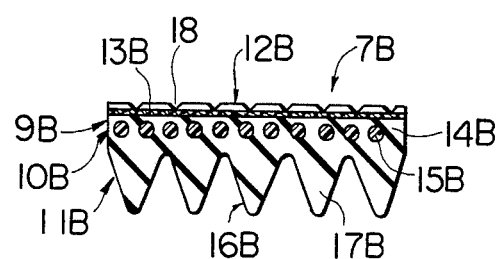

The construction of the power transmission belt 7, according to this invention, is as shown in FIGS. 2 or 3. FIG. 2 shows a ribbed belt 7A which comprises a tension section 9, a neutral axis section 10 and a compression section 11. The tension section 9 is made of rubberized fabric and extensible rubber 14. The upper surface of the tension section 9, i.e., the outer surface 12 of the belt is flat. In the neutral axis section 10, a twisted polyester or aromatic polyamide cord 15 is spirally wound. The compression section 11 has a plurality of ribs 17 arranged longitudinally of the belt. Each rib 17 has a triangular section as viewed in the direction of the width of the belt. Thus, the inner surface 16 of the belt can sufficiently fit in the groove of a pulley.

FIG. 3 shows another type of ribbed belt 7B, which is obtained by modifying the ribbed belt shown in FIG. 2 so that there are grooves 18 in the outer surface 12B of the belt. The grooves 18 are in parallel with the ribs 17B on the inner surface 16B of the belt. The configuration of the groove 18 is V-shaped, rectangular, trapezoidal or semi-circular so that the grooves are suitable engaged with the protrusions of the fan pulley 3 driven by the outer surface of the belt.

Figure 4:
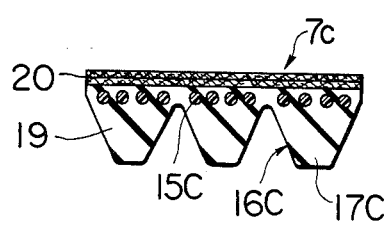
FIGS. 4 and 5 are sectional views showing banded belts employed for the drive device according to the invention.
Figure 5:
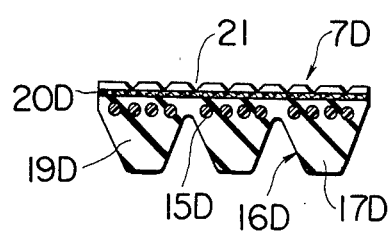

FIGS. 4 and 5 show banded belts 7C and 7D, respectively, which are different from the belts shown in FIGS. 2 and 3. In belts 7C and 7D, the upper surfaces of a plurality of V-belt bodies 19 have a trapezoidal section and are connected with a tie band 20 of rubberized fabric or rubberized cord fabric. As in the belt shown in FIG. 3, the belt shown if FIG. 5 has shallow grooves 21 on the outer surface. The configuration of the groove 21 is V-shaped, rectangular, trapezoidal or semi-circular. These belts 7C and 7D can be used to achieve the same results as that of the belts shown in FIGS. 2 and 3.

The banded belt shown in FIGS. 4 (or 5) has ribs 17C (or 17D) having a trapezoidal section as viewed in the direction of the width of the belt.

Figure 6:
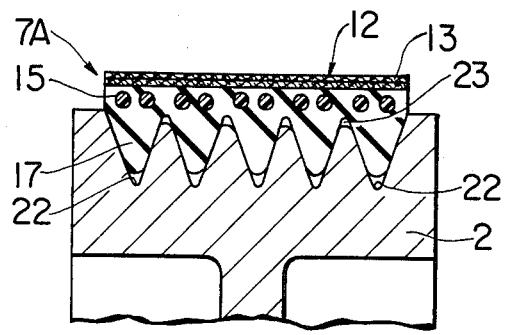
FIG. 6 is a sectional view taken along line X—X' in FIG. 1.

FIG. 6 is a sectional view taken along X—X' in FIG. 1, showing the above-described belt (7A, 7B, 7C or 7D) laid over the pulley 2 in the drive device. That is, FIG. 6 is intended to show the state of the crank pulley 2, power steering pulley 4, alternator pulley 5 or cooler pulley 6 which is driven by the inner surface of the belt.

Each of the pulleys 2, 4, 5 and 6 has V-shaped grooves 22 in the outer wall thereof which mate with the ribs 17 of the ribbed belt 7A. It should be noted that each V-shaped groove 22 is not completely filled with the rib 17. That is, there is a small amount of space 23 at the root of the rib or on the top of the protrusion of the V-shaped groove, whereby the power transmission capability is improved.

Figure 7:
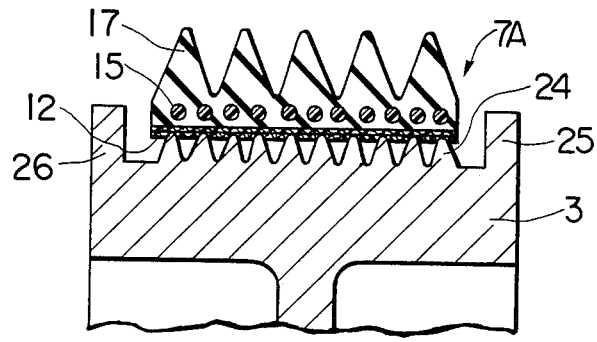
FIG. 7 is a sectional view taken along line Y—Y' in FIG. 1.

FIG. 7 is a sectional view taken along line Y—Y' showing a state of the fan pulley 3 driven by the outer surface of the belt. The pulley 3 has a plurality of protrusions 24, 0.5–3.0 mm higher than the bottom surface arranged in parallel and circumferentially on the surface of the pulley. The pulley 3 has flanges 25 and 26, 1–10 mm higher than the protrusions 24 on both sides of the pulley. The tops of the protrusions 24 of the pulley 3 are not sharp, which protect the outer surface 12 of the belt from being damaged or cracked. It is necessary to bring the outer surface 12 of the belt in close contact with the pulley 3. In this case, the protrusions 24 of the pulley are engaged with the outer surface 12 of the belt. As a result, transverse shifting of the belt can be prevented.

Figure 8:
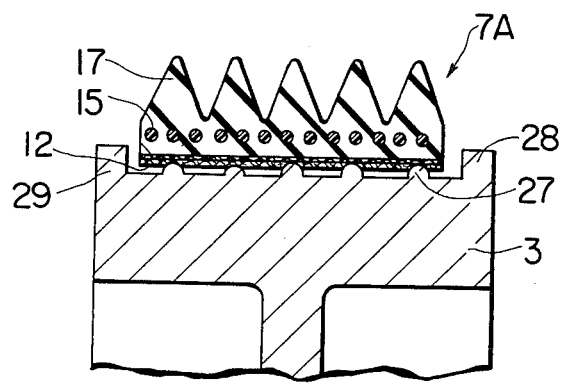
FIG. 8 is a sectional view taken along line Y—Y' in FIG. 1, showing a second example of a fan pulley.

FIG. 8 is a sectional view taken along line Y—Y in FIG. 1, showing another example of the fan pulley 3. This pulley has a plurality of protrusions 27, 0.5–3.0 mm high, having a semi-circular section. The protrusions 27 are arranged in parallel and circumferentially about the pulley. The pulley further has flanges 28 and 29 higher by 1–10 mm than the protrusions 27. Since the protrusions 27 positively engage the outer surface 12 of the belt, transverse shifting of the belt is prevented, and the flanges 28 and 29 prevent the belt from coming off the pulley.

The configuration of the protrusions 24 or 27 formed on the surface of the fan pulley 3 is not limited to the V-shaped or semicircular one, that is, it may be rectangular or trapezoidal.

With the ribbed belt 7B (or the banded belt 7D) having the grooves 18 (or 21) as shown in FIG. 3 (or 5), the grooves 18 (or 21) are engaged with the protrusions 24 (or 27) of the pulley 3 to drive the latter. In this case, the configuration of the grooves on the outer surface of the belt is the same as that of the protrusions of the pulley 3.

As is apparent from the above description, in the drive device according to this invention, pulleys having various grooves are employed with the pulley driven by the outer surface of the ribbed belt or the banded belt. Therefore, the merits of the use of the ribbed belt or the banded belt can be utilized. The problems of non-uniform wear, generation of abnormal sound, and disengagement of the belt, caused by transverse shifting of the belt, can be positively prevented. Thus, the drive device according to the invention is significantly effective as a drive device of a V-belt for an automobile or the equivalent.

It is apparent that other modification may be made without departing from the scope of this invention.

What is claimed is:

1. In a device of a power transmission system having a driving pulley, a plurality of driven pulleys, and a power transmission belt having outer and inner surfaces laid in a serpentine manner over said pulleys, the improvement comprising: said driving pulley and at least one driven pulley contacting the inner surface of said power transmission belt, said pulleys in contact with the inner surface having a plurality of circumferentially arranged V-grooves, each of said V-grooves being fitted to ribs formed on the inner surface of said belt, and the remaining pulley or pulleys engaging the outer surface of said power transmission belt and having a plurality of semicircular protrusions extending circumferentially outwardly therefrom arranged in parallel and axially spaced at equal intervals, said protrusions having a height in a range of 0.5 mm to 3.0 mm, said protrusions being relatively small with respect to said ribs, said protrusions engaging the outer surface of said belt such that transverse shifting of said belt is prevented while torque is transmitted from said belt to said remaining pulley or pulleys, and said power transmission belt being an endless belt having a plurality of said ribs arranged longitudinally thereof, said ribs being substantially equal in section along the widthwise direction of said belt, and said outer surface of said belt being at least initially substantially flat.

2. A drive device as claimed in claim 1, wherein shafts of said driving pulley and said plurality of driven pulleys are in parallel with one another, and the V-grooves of said driving pulley and at least one driven pulley which are in contact with the inner surface of said power transmission belt are in the same plane.

3. A drive device as claimed in claim 1, wherein said driven pulley or pulleys have flanges higher than the top of said protrusions on both sides of said pulley.

4. The drive device as claimed in claim 3 wherein said flanges are 1 to 10 mm higher than the top of said protrusions.

5. A drive device as claimed in claims 1 or 3, wherein said power transmission belt is a ribbed belt comprising a tension section, a neutral axis section and a compression section, said tension section forming the flat outer surface of said belt, said compression section having a plurality ribs arranged longitudinally thereof.

6. A drive device as claimed in claims 1 or 3 in which said power transmission belt is a banded belt comprising a plurality of V-belt bodies having a trapezoid section and arranged in parallel and separately from one another, and a tie band of rubberized fabric or rubberized cord fabric laid over the upper surfaces of said V-belt bodies to connect the latter.

7. A drive device as claimed in claim 1, further comprising a tension pulley for adjusting the tension of said power transmission belt at least at one position between said pulleys.

8. In a device of a power transmission system having a driving pulley, a plurality of driven pulleys, and a power transmission belt having outer and inner surfaces laid in a serpentine manner over said pulleys, the improvement comprising:

said driving pulley and at least one driven pulley contacting the inner surface of said power transmission belt, said pulleys in contact with the inner surface having a plurality of circumferentially arranged V-grooves, said V-grooves being fitted to ribs formed on the inner surface of said belt, and the remaining pulley or pulleys engaging the outer surface of said power transmission belt and having a plurality of protrusions extending circumferentially outwardly therefrom arranged in parallel and axially spaced at equal intervals, said protrusions having a height in a range of 0.5 to 3.0 millimeters, said protrusions being relatively small with respect to said ribs, said protrusions engaging the outer surface of said belt such that transverse shifting of said belt is prevented while torque is transmitted from said belt to said remaining pulley or pulleys, said power transmission belt being an endless belt having a plurality of said ribs arranged longitudinally thereof, said ribs being substantially equal in section along the widthwise direction of said belt, said belt including a tension section, a neutral axis section and a compression section, said tension section forming the outer surface of said belt, said compression section having a plurality of said ribs arranged longitudinally thereof, and said belt having grooves on the outer surface thereof, the configuration of said grooves mating that of said protrusions so that said grooves can engage with said remaining pulley or pulleys.

9. In a device of a power transmission system having a driving pulley, a plurality of driven pulleys, and a power transmission belt having outer and inner surfaces laid in a serpentine manner over said pulleys, the improvement comprising:

said driving pulley and at least one driven pulley contacting the inner surface of said power transmission belt, said pulleys in contact with the inner surface having a plurality of circumferentially arranged V-grooves, said V-grooves being fitted to ribs formed on the inner surface of said belt, and the remaining pulley or pulleys engaging the outer surface of said power transmission belt and having a plurality of protrusions extending circumferentially outwardly therefrom arranged in parallel and axially spaced at equal intervals, said protrusions having a height in a range of 0.5 to 3.0 millimeters, said protrusions being relatively small with respect to said ribs, said protrusions engaging the outer surface of said belt such that transverse shifting of said belt is prevented while torque is transmitted from said belt to said remaining pulley or pulleys, said power transmission belt being an endless belt havig a plurality of said ribs arranged longitudinally thereof, said ribs being substantially equal in section along the widthwise direction of said belt, said belt comprising a banded belt including a plurality of V-belt bodies having a trapezoid section and arranged in parallel and separately from one another, and a tie-band of rubberized fabric or rubberized cord fabric laid over the upper surfaces of said V-belt bodies to connect the latter, said banded belt having grooves on the outer surface thereof, the configuration of said grooves mating that of said protrusions so that said grooves can engage with said remaining pulley or pulleys.

* * * * *